(12) United States Patent
Kinnear, Jr. et al.

(10) Patent No.: US 8,732,281 B2
(45) Date of Patent: May 20, 2014

(54) ACTIVELY UPDATING CLIENTS WITH SELECTED DATA

(75) Inventors: Kenneth Kinnear, Jr., Boxborough, MA (US); Neil Russell, Wakefield, MA (US); Mark Stapp, Belmont, MA (US); Bernard Volz, Center Harbor, NH (US)

(73) Assignee: Cisco Technology, Inc., San Jose, CA (US)

( * ) Notice: Subject to any disclaimer, the term of this patent is extended or adjusted under 35 U.S.C. 154(b) by 369 days.

(21) Appl. No.: 12/465,113

(22) Filed: May 13, 2009

(65) Prior Publication Data

US 2010/0293257 A1  Nov. 18, 2010

(51) Int. Cl.
*G06F 15/177*  (2006.01)
(52) U.S. Cl.
USPC .......................................... 709/221; 709/220
(58) Field of Classification Search
USPC ....................................................... 709/221
See application file for complete search history.

(56) References Cited

U.S. PATENT DOCUMENTS

2005/0099955 A1*  5/2005  Mohan et al. .................. 370/242
2009/0222590 A1*  9/2009  Van Aken et al. ............. 709/249

OTHER PUBLICATIONS

Brzozowski et al. ("DHCPv6 Leasequery", Sep. 2007, Network Working Group, RFC 5007, J. Brzozowski, K. Kinnear, B. Volz and S. Zeng).*
Woundy et al. ( "Dynamic Host Configuration Protocol (DHCP) Leasequery", Feb. 2006, Network Working Group, RFC 4388, R. Woundy & K. Kinnear).*

\* cited by examiner

*Primary Examiner* — Dustin Nguyen
*Assistant Examiner* — Joel Mesa
(74) *Attorney, Agent, or Firm* — Hickman Palermo Truong Becker Bingham Wong LLP

(57) ABSTRACT

In an embodiment, a data processing apparatus comprising one or more electronic digital processors; Dynamic Host Configuration Protocol (DHCP) server logic coupled to the one or more processors; an active leasequery channel response logic coupled to the DHCP server logic which when executed causes the one or more processors to perform receiving, from a particular DHCP client among a plurality of DHCP clients, an active leasequery initiation message requesting the DHCP server logic to actively send update messages about changes in network address leases that the DHCP server logic manages; wherein the active leasequery initiation message comprises a channel identifier value; determining whether the channel identifier value matches a client class that the DHCP server logic manages; in response to determining that the channel identifier value does match a client class identifier that the DHCP server logic manages, sending, to the particular DHCP client, one or more DHCP response messages describing any changes in network address leases that the DHCP server logic performs only for a subset of the DHCP clients that are in the matched client class.

20 Claims, 4 Drawing Sheets

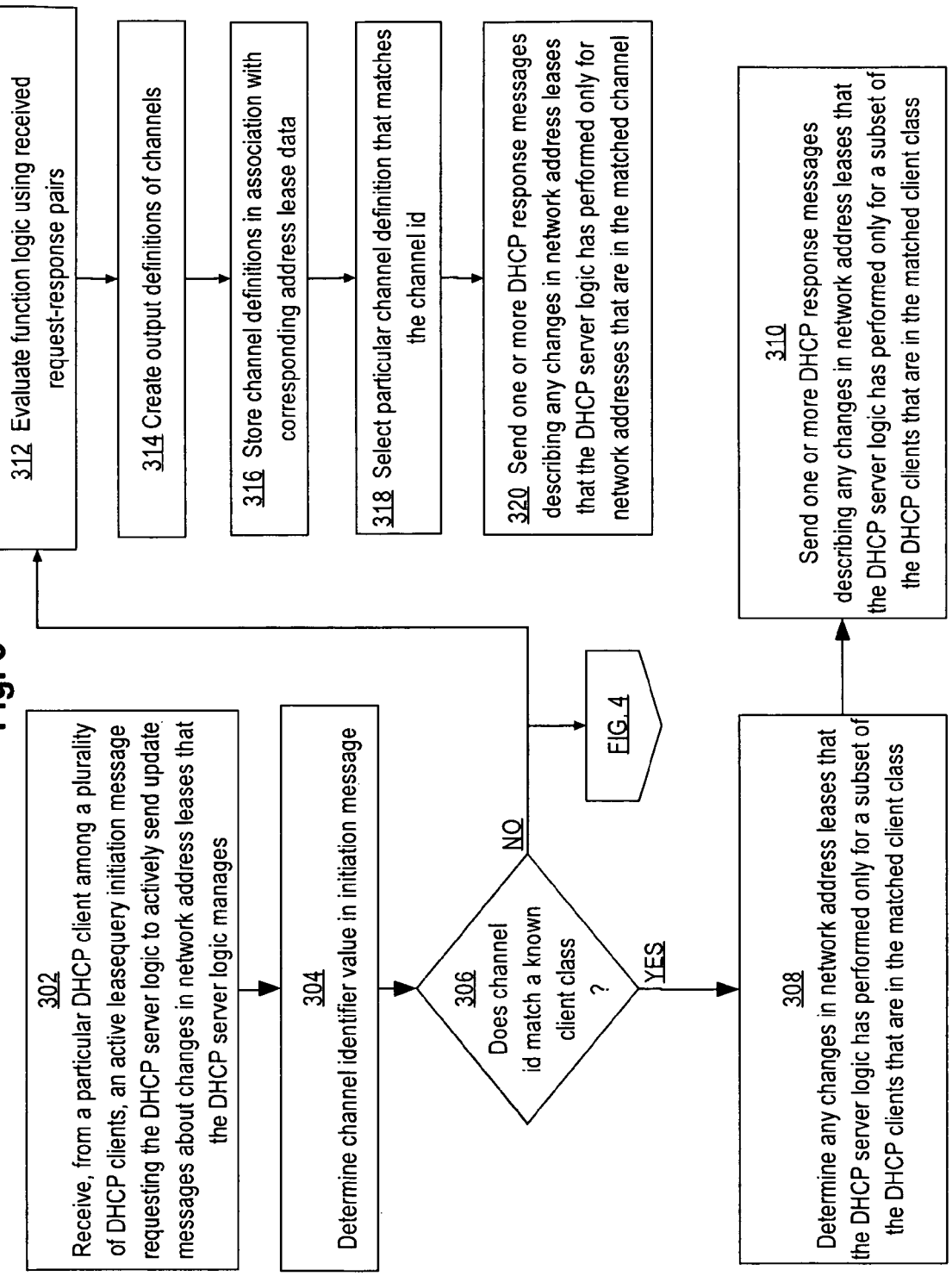

ACTIVELY UPDATING CLIENTS WITH SELECTED DATA

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright © 2008-2009 Cisco Systems, Inc.

FIELD OF THE INVENTION

The present invention relates to management of networked client-server computing systems.

BACKGROUND

In networked computing systems, servers commonly manage databases having contents that are useful to clients. For example, dynamic host configuration protocol (DHCP) servers maintain information in an internal internet protocol (IP) address binding databases that other processes may need to access to meet operational or regulatory needs. Some DHCP servers allow external processes access to their internal databases in order to meet these needs, but such internal access is not always possible.

To meet the needs of external processes, in one approach, the DHCP server could be configured to transmit information from the DHCP server to an external process; however, if the external process is unavailable for a period of time or runs more slowly than the DHCP server needs to update the process, dealing with speed mismatches can be complex. When connections are lost and have to be restarted, multiple retry messages may be needed. Providing near-real-time updates may be challenging.

The DHCPv4 Leasequery, specified in Request for Comments (RFC) 4388 of the Internet Engineering Task Force, or DHCPv6 Leasequery (RFC 5007) and DHCPv6 Bulk Leasequery (RFC 5460), provide techniques to query a DHCP server for certain data. The approaches of RFC 4388 and RFC 5007/RFC 5460 require polling the DHCP server for the data. Polling approaches can be difficult to scale to large numbers of clients, if the goal is to keep an external database up-to-date with an internal DHCP IP address binding database. The result may be that synchronization cannot be achieved because too much time passes between updates, or too much time elapses between a change in the DHCP server database and clients receiving an update at the external process.

Certain commercial products provide direct access to the DHCP server's internal database. An example is Cisco Network Registrar (CNR), commercially available from Cisco Systems, Inc., San Jose, Calif. However, such access usually requires the use of proprietary techniques or data and does not easily allow for activity to be triggered by specific changes to the IP address binding database. For example, a networking engineer would have to create an extension to the CNR DHCP server that transmits DHCP binding database updates to an external process. Other products provide continuous updates as to status, but do not deal with the problems of reliability in an effective way.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 3 illustrates a process of communicating active leasequery information using a channel approach.

DETAILED DESCRIPTION

Figure 1:
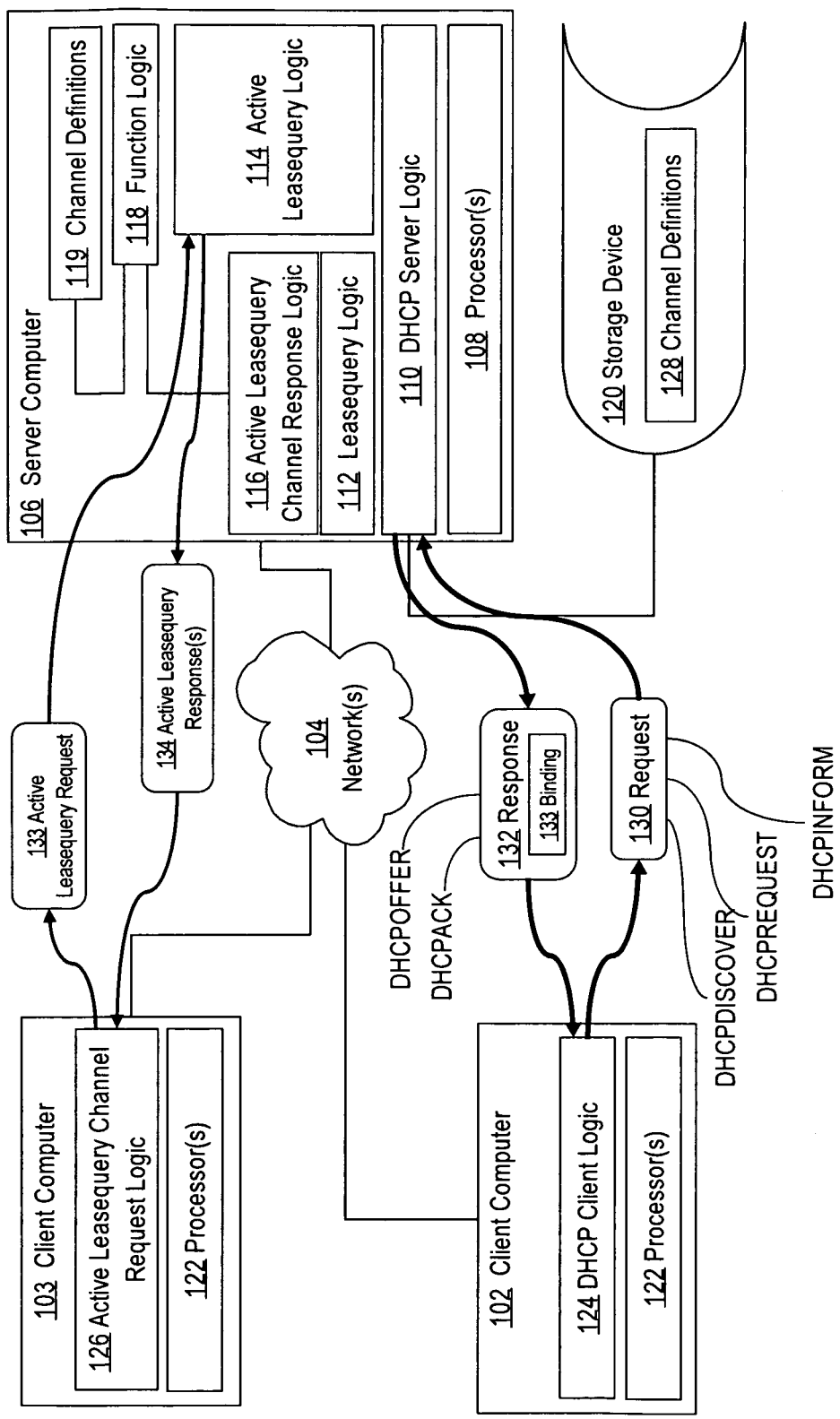
FIG. 1 illustrates a client computer, server computer, and storage device configured according to example embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described in sections conforming to the following outline:

1.0 General Overview
2.0 Active Leasequery
3.0 Active Leasequery Channels
4.0 Implementation Mechanisms-Hardware Overview
5.0 Extensions and Alternatives
* * *

1.0 General Overview

In an embodiment, a data processing apparatus comprises one or more electronic digital processors; Dynamic Host Configuration Protocol (DHCP) server logic coupled to the one or more processors; an active leasequery channel response unit coupled to the DHCP server logic and which when executed causes the one or more processors to perform receiving, from a particular DHCP client among a plurality of DHCP clients, an active leasequery initiation message requesting the DHCP server logic to actively send update messages about changes in network address leases that the DHCP server logic manages; wherein the active leasequery initiation message comprises a channel identifier value; determining whether the channel identifier value matches a client class that the DHCP server logic manages; in response to determining that the channel identifier value does match a client class identifier that the DHCP server logic manages, sending, to the particular DHCP client, one or more DHCP response messages describing any changes in network address leases that the DHCP server logic performs only for a subset of the DHCP clients that are in the matched client class.

In an embodiment, a storage device is coupled to the DHCP server logic and configured to receive data defining a plurality of request-response pairs comprising corresponding DHCP client request messages and DHCP server response messages; the logic is further configured to perform, in response to determining that the channel identifier value does not match any client class identifier that is stored in association with the DHCP server logic evaluating a stored functional expression against all of the request-response pairs; creating, as output from the functional expression, a plurality of definitions of zero or more channels; storing each of the definitions with corresponding address lease data; selecting a particular definition that matches the channel identifier value; for each network address that is associated with one of the request-response pairs that is associated with the particular definition, sending, to the particular DHCP client, one or more DHCP response messages describing any changes in network address leases that the DHCP server logic performs for that network address.

In an embodiment, the functional expression comprises functional logic configured to access one or more fields of a DHCP packet, to perform one or more conditional evaluations based on values of the fields, and to generate a return value based on the evaluations.

In an embodiment, the DHCP client request messages comprise any of, but not limited to, DHCPDISCOVER, DHCPREQUEST, and DHCPINFORM messages; wherein the DHCP server response messages comprise any of DHCPOFFER and DHCPACK messages.

In an embodiment, the logic is further configured to perform, in response to determining that the channel identifier value does not match any client class identifier that is stored in association with the DHCP server logic processing all request-response pairs that are stored in association with the DHCP server logic using DHCP server extension logic; creating, as output from the DHCP server extension logic, a plurality of definitions of zero or more channels; storing each of the definitions with corresponding address lease data; selecting a particular definition that matches the channel identifier value; for each network address that is associated with one of the request-response pairs that is associated with the particular definition, sending, to the particular DHCP client, one or more DHCP response messages describing any changes in network address leases that the DHCP server logic performs for that network address.

In an embodiment, the DHCP response messages comprise IP address binding information retrieved from an IP lease status database of the DHCP server logic.

In an embodiment, each of the DHCP response messages carrying active leasequery channel information is any of a DHCPLEASEACTIVE message, a DHCPLEASEUNASSIGNED message, or a DHCPLEASEQUERYSTATUS message. Request messages may comprise DHCPACTIVELEASEQUERY messages.

In an embodiment, the DHCP server logic manages Internet protocol version 6 (IPv6) network addresses and can use DHCPv6 and corresponding messages such as DHCPSOLICIT, ADVERTISE, REQUEST, REPLY, etc. Other embodiments may operate using IPv4 addresses and DHCPv4 messages.

In an embodiment, a functional expression when executed causes evaluating DHCPDISCOVER request packets against option 82 suboptions or other DHCP options and return different values depending on what is evaluated in the request packets.

In other embodiments, a computer-readable storage medium and a data processing method are provided.

2.0 Structural Overview

FIG. 1 illustrates client computers, a server computer, and a storage device configured according to example embodiments. Client computer 102 comprises one or more processors 122, and DHCP client logic 124. Another client computer 103 comprises one or more processors 122, and active leasequery channel request logic 126. In this example arrangement, client computer 102 performs DHCP request-response message exchanges with server computer 106 using various DHCP messages as denoted in FIG. 1. Other example messages include DHCDISCOVER, REQUEST, INFORM, RELEASE, and DECLINE in DHCPv4, or DHCPSOLICIT, REQUEST, RENEW, REBIND, RELEASE, DECLINE, and INFORMATIONREQUEST in DHCPv6. The client computer 103 uses the techniques herein to obtain information about changes relating to the client computer 102 or other client computers. In an embodiment, client computer 103 can connect to active leasequery logic 114, described further herein, and exchange one or more Active Leasequery Requests 133 and Active Leasequery Responses 134, such as DHCPACTIVELEASEQUERY, DHCPLEASEQUERYSTATUS, DHCPLEASEACTIVE and DHCPLEASEUNASSIGNED messages.

The client computers 102, 103 may comprise a desktop computer, workstation, notebook computer, mobile device, or other computer. The processors 122 may comprise a single CPU, multiple CPUs, multi-core CPUs, or other processors or controllers. The DHCP client logic 124 implements a dynamic host control protocol client in compliance with Requests for Comments (RFCs) defining DHCP. The active leasequery channel request logic 126 implements the functions further described herein for client-side operations relating to active leasequery channels.

Client computers 102, 103 are coupled directly or indirectly through one or more networks 104 to the server computer 106. Networks 104 may comprise any of one or more wired or wireless local area networks, wide area networks, internetworks, or a combination thereof using any data communication protocols that can support transport of DHCP messages.

In an embodiment, server computer 106 comprises one or more processors 108, DHCP server logic 110, leasequery logic 112, active leasequery logic 114, active leasequery channel response logic 116, function logic 118, and stored channel definitions 119. In various embodiments, server computer 106 comprises a personal computer, workstation, desktop computer, or other computer, or an internetworking device such as a router, switch, or gateway.

The processors 108 may comprise a single CPU, multiple CPUs, multi-core CPUs, or other processors or controllers. The DHCP server logic 110 implements a dynamic host control protocol server in compliance with Requests for Comments (RFCs) defining DHCP, and is coupled to a storage device 120 that maintains a database or mapping of network address bindings to client computer identifiers. Storage device 120 also stores channel definitions 128 in association with lease data for use in the functions that are further described herein. For example, definitions of the active leasequery channel(s) last associated with a lease are stored in the storage device 120.

The leasequery logic 112 implements DHCP leasequery functions as described in RFC 4388 (for DHCPv4) and/or RFC 5007 (for DHCPv6).

The active leasequery logic 114 comprises logic configured to use the message format of DHCPv4 or DHCPv6 leasequery packets and to send messages over a transport layer network connection when a change occurs, instead of responding only to a leasequery request. Thus, the active leasequery logic 114 is configured to actively update an external process with network address binding information. The active leasequery channel response logic 116 comprises logic generally configured to keep an external process or database synchronized with the network address binding database that is maintained by DHCP server logic 110. Particular functions of the active leasequery channel response logic 116 are further described in other sections herein. The active leasequery channel response logic 116 is coupled to function logic 118 and stored channel definitions 119 and uses these elements in the manner further described herein.

Figure 2:
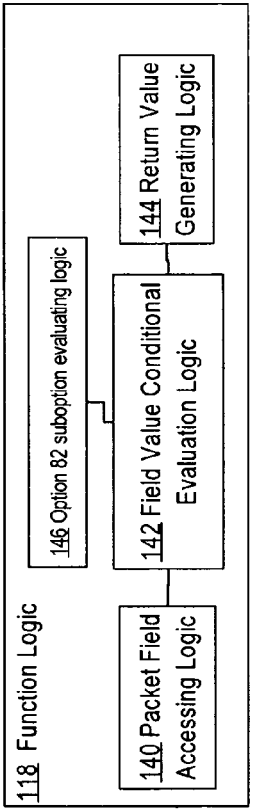
FIG. 2 illustrates function logic configured according to an example embodiment.

FIG. 2 illustrates function logic configured according to an example embodiment. Generally, function logic 118 is configured to examine a DHCP message and determine a channel identifier for the message when a channel identifier is unknown at the time of receiving the message. Function logic 118 comprises a packet field accessing logic 140 coupled to a field value conditional evaluation logic 142, which is coupled to a return value generating logic 144. Field value conditional evaluation logic 142 may be coupled to an option 82 suboption evaluating logic 146.

In this arrangement, function logic 118 can access fields of network packets that contain DHCP messages, evaluate values of fields against specified conditions, and generate return values. The use of function logic 118 in generating channel identifiers is described further herein. Function logic 118 may be integrated into or integrally formed with active leasequery channel response logic 116. Return values may comprise Channel Definition Strings as further described herein or identifiers of individual channels.

Each of the DHCP client logic 124, active leasequery channel request logic 126, function logic 118, active leasequery response logic 116, active leasequery logic 114, leasequery logic 112, and DHCP server logic 110, and their internal elements, may be implemented in various embodiments using a computer, one or more application-specific integrated circuits (ASICs) or other digital electronic logic, one or more computer programs, modules, objects, methods, or other software elements. For example, in one embodiment server computer 106 may comprise a special-purpose computer having particular logic configured to implement the elements and functions described herein. In another embodiment, server computer 106 may comprise a general purpose computer as in FIG. 5, loaded with one or more stored programs which transform the general purpose computer into a particular machine upon loading and execution.

3.0 Functional Overview 3.1 General Theory of Operation

In operation, in general, active leasequery channel response logic 116 can keep an external database synchronized with the DHCP address binding database of DHCP server logic 110 even if the external process periodically is disconnected and/or does not always have sufficient processing bandwidth required to process updates from the DHCP server logic. The active leasequery channel response logic 116 can achieve synchronization when the external process is disconnected for a short time or a long time. In an embodiment, if the external process is disconnected for a short time, the DHCP server logic 110 stores information to send at the time that the external process next asks for an active leasequery connection. As part of requesting a connection, the external process informs the DHCP server logic 110 of the time at which the external process last received information from the DHCP server logic. If the DHCP server logic 110 has saved enough information, then using active leasequery channel response logic 116, the DHCP server logic sends the stored information and also sends the real-time information that is requested. Therefore, after a short time the external process becomes updated with the address binding database of the DHCP server logic 110.

In an embodiment, it is possible that the DHCP server logic 110 may not save enough information to satisfy the external processes request. In that case, the external process requests a complete data dump from the DHCP server logic.

In an embodiment, active leasequery channel response logic 116 is configured to suggest or cause the DHCP server logic 110 to save information about which address records incurred changes while the external process is unable to accept updates reflecting the changes. Such a configuration enables the server computer 106 to cause synchronization with an external process even when the external process does not respond fast enough, or becomes disconnected. In an embodiment, the external process is configured to store data indicating the time of the last address change that the external process received. When the external process reconnects later, or if the server drops the connection in response to a timeout, the external process informs the DHCP server logic 110 about the last update it received. The DHCP server logic 110 then determines if enough stored information exists to inform the external process about what changed during the disconnection.

Using these processes, the external process and the DHCP server can efficiently cooperate and recover from short periods of unavailability or disconnection of the external process, while still allowing the external process to recover additional data beyond that saved in an easily accessible way by the DHCP server.

In an embodiment, the active leasequery channel response logic 116 is configured to publish information from the DHCP server logic 110 so that the client computer 103 does not need to poll the server. The approach herein uses an industry standard message format to keep an external process up to date with network address binding information. The approach addresses real-world issues in which two processes may not always be connected or able to process information at the same rate.

Active leasequery logic 114 is configured to cooperate with DHCP server logic 110 and leasequery logic 112 to enable a process external to the DHCP server keep a database up to date with network address bindings performed by the DHCP server. In an embodiment, active leasequery logic 114 is configured only to deliver information about all IP address binding changes. Active leasequery channel response logic 116 enables the external process to receive data about binding changes concerning only certain network addresses. Additionally or alternatively, active leasequery channel response logic 116 enables the external process to receive data only about certain network address binding changes on any network address.

In an embodiment, the active leasequery channel response logic 116 is configured to receive a request relating to a communication transaction between the client computer 102 and the server computer 106, and to determine a logical channel to which a transaction belongs. The channel then controls the transmission of network address binding database data to an external process such as DHCP client logic 124 or active leasequery channel request logic 126 of client computer 103. The use of channels and channel identifiers provides a more efficient, structured and predictable approach as compared to the use of a program code extension that simply decides to send a particular database transaction update to an external process. The approach herein enables defining multiple channels for a particular database transaction and returning a list of channel identifications. For example, one channel might be associated with voice-over-IP phones and another channel could relate to non-routable addresses. In the present approach, a client computer can request the output of a specific channel as part of an active leasequery request.

3.2 Operational Example

Figure 4:
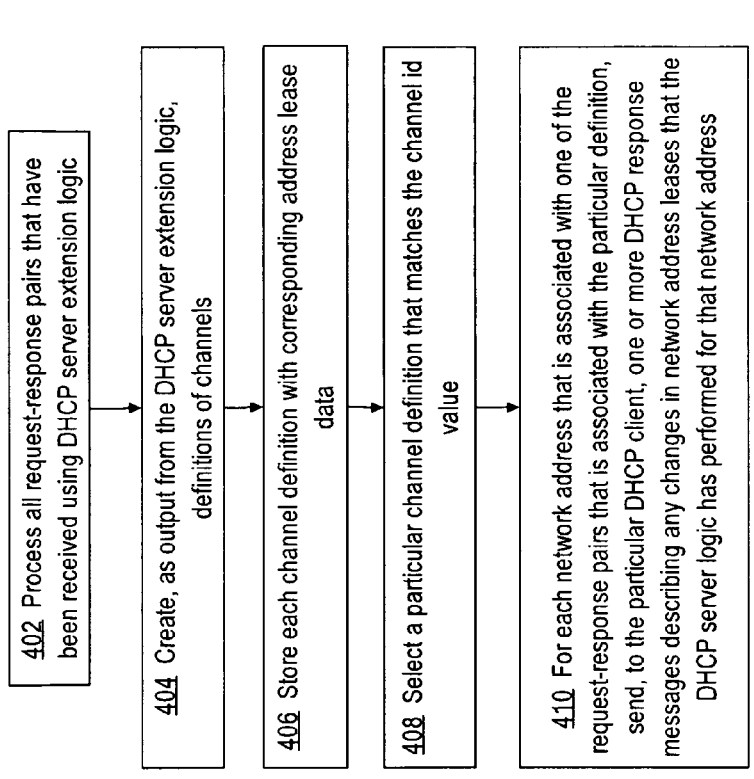
FIG. 4 illustrates a sub-approach for FIG. 3 in which extension logic performs certain functions.

FIG. 3 illustrates a process of communicating active leasequery information using a channel approach. FIG. 4 illustrates a sub-approach for FIG. 3 in which extension logic performs certain functions. Referring first to FIG. 3, in step 302 a process receives, from a particular DHCP client among a plurality of DHCP clients, an active leasequery initiation message requesting the DHCP server logic to actively send update messages about changes in network address leases that the DHCP server logic manages. The initiation message may be an Active Leasequery request, but that format is not required and the broad channels concept described herein is usable with requests or packets in a variety of formats.

The active leasequery initiation message comprises a channel identifier value. The channel identifier value may be formed as a text string comprising a DHCP "Client-Class". In this context, "Client Class" is a value that classifies a group of DHCP clients according to various criteria such as MAC address or other attributes; client class values are used in Cisco Network Registrar, for example, but not for the functions and purposes described in this disclosure. The use of a Client-Class value provides an efficient reuse of an existing classification mechanism that the DHCP server logic 110 uses to distinguish clients. However, a Client-Class is not required and in other embodiments, numeric values or structured data values may be used.

In step 304, the process determines or extracts the channel identifier value from the initiation message, and in step 306 a test is performed to determine whether the channel identifier value matches a known client class—that is, a client class that the DHCP server logic manages.

In response to determining that the channel identifier value does match a client class identifier that the DHCP server logic manages, so that the test of step 306 is positive, in step 308 the process determines any changes in network address leases that the DHCP server logic performs only for a subset of the DHCP clients that are in the matched client class. At step 310 the process sends, to the particular DHCP client, one or more DHCP response messages describing any changes in network address leases that the DHCP server logic performs only for a subset of the DHCP clients that are in the matched client class. In an embodiment, each response message uses the DHCP packet format and the DHCPLEASEQUERY approach of RFC 4388, RFC 5007, and RFC 5460 as a container or conduit.

Thus, a valid channel identifier in a request message acts as an explicit specification of a group of one or more clients about which the server should return network address lease change data. By including a channel identifier on the input request, an active leasequery request from client computer 103 is interpreted as a request for only those messages which belong to that particular channel. If the channel identifier matches some existing client class configured in the DHCP server, then the active leasequery output stream includes changes for only those IP addresses whose most recent request belonged to the specified client class.

The client request may also specify a channel identifier that is new, unknown, or does not match a known client class in the DHCP server. To address this possibility, in an embodiment, the storage device 120 coupled to the DHCP server logic 110 is configured to receive or obtain data defining a plurality of request-response pairs 128 comprising corresponding DHCP client request messages and DHCP server response messages. Further, in the process of FIG. 3, if the test of step 306 is negative and determines that the channel identifier value does not match any client class identifier that is stored in association with the DHCP server logic, then in step 312 the process evaluates the function logic 118 for all the request-response pairs.

In one embodiment, step 312 involves evaluating a stored functional expression against all of the request-response pairs. Expressions may use the format that is defined, for example, in User Guide for Cisco Network Registrar 7.0, Chapter 25, "Using Expressions," available at the time of this writing in the document UG25_Exp.html in the folder or directory /en/US/docs/net_mgmt/network_registrar/7.0/user/guide/ at the domain cisco.com on the World Wide Web, and the entire contents of which are hereby incorporated by reference as if fully set forth herein. In an embodiment, the expression language is related to the Lisp language and provides functions for accessing contents of DHCP packets. The expressions produce a string value, which is then matched in other parts of the configuration. A Client-Class Expression produces a client-class name. In contrast, the present disclosure proposes a Channel Definition Expression to produce a list of channels.

In step 314 the process creates, as output from the functional expression, a plurality of definitions of zero or more channels, and in step 316 each of the definitions is stored with corresponding address lease data. In an embodiment, each channel definition comprises a string that may be denoted a Channel Definition String and identifies one or more channels to which a request-response pair belongs.

In step 318, the process selects a particular definition that matches the channel identifier value. In step 320 the process sends, for each network address that is associated with one of the request-response pairs that is associated with the particular definition, to the particular DHCP client, one or more DHCP response messages describing any changes in network address leases that the DHCP server logic performs for that network address.

Thus, in the approach of step 312 to 320, as an alternative to an explicit channel identifier, an expression can be used to evaluate a request/response pair to determine the set of channels the pair belongs to.

In an embodiment, step 312 involves executing the function logic 118 of FIG. 2. During execution, packet field access logic 140 accesses one or more fields of a received DHCP packet. Field value conditional evaluation logic 142 performs one or more conditional evaluations based on values of the fields. Return value generating logic 114 generates a return value based on the evaluations. The return value represents a channel definition and can be used to select matching changes from the DHCP server database.

In various embodiments, the initiation message of step 302 is received in a DHCP active leasequery request message that is comprised of a DHCPACTIVELEASEQUERY message. The response messages that are sent at steps 310, 320 can comprise any of a DHCPLEASEACTIVE message, a DHCPLEASEUNASSIGNED message or a DHCPLEASEQUERYSTATUS message.

As indicated in FIG. 3 by the NO branch from step 306, the approach of FIG. 4 also may be used in response to determining that the channel identifier in a request message does not match a known client class. Referring now to FIG. 4, in an embodiment, at step 402 the process inspects all request-response pairs that are stored in association with the DHCP server logic using DHCP server extension logic.

In step 404, as output from the DHCP server extension logic, a plurality of definitions each comprising one or more channels is created. For example, the extension is configured to create a Channel Definition String for each request-response pair, identifying one or more channels to which the pair belongs. In step 406, each of the definitions is stored with corresponding address lease data.

Step 408 involves selecting a particular definition that matches the channel identifier value. At step 410, for each network address that is associated with one of the request-response pairs that is associated with the particular definition, the process sends, to the particular DHCP client, one or more DHCP response messages describing any changes in network address leases that the DHCP server logic performs for that network address.

Therefore, using the approach of FIG. 4, DHCP server extension logic integrated with or incorporated into DHCP server logic 110 (FIG. 1) can perform functions equivalent to the functions described above for function logic 118 of FIG. 2. For example, a CNR extension may be used to determine the channel name for a packet. In an embodiment, a CNR extension is called during packet processing to dynamically loaded code written in C/C++ or TCL scripts, which can alter or classify packets, potentially with the aid of external systems.

Considering FIG. 3 and FIG. 4 together, if the channel identifier in a request does not match some existing, configured client class, then each request-response pair is examined to determine if the pair belongs in the channel, and if it does, then any change to the binding information for the IP address is output to the active leasequery client. A request-response pair can be associated with a channel either through the evaluation of a channel definition expression embodied in function logic 118 (FIG. 1, FIG. 2, FIG. 3 steps 312-320), or through the action of special case code executed in a DHCP server extension (FIG. 4). As a result, a channel definition string may be created that specifies all of the channels to which a request-response pair belongs. The channel definition string is saved as part of the IP address binding information in storage device 120, and the saved value may be used when there is no input request to which can be applied the channel definition expression.

In any of the embodiments herein, the DHCP response messages may specifically comprise IP address binding information retrieved from an IP lease status database at storage device 120 or otherwise associated with the DHCP server logic 110.

The foregoing description has focused on operations with Internet protocol version 4 (IPv4) addresses and messages. In an embodiment, the DHCP server logic manages Internet protocol version 6 (IPv6) network addresses.

In an embodiment, the functional expression or function logic 118 when executed at step 312 causes evaluating DHCPDISCOVER request packets against option 82 suboptions or other DHCP options using one or more if statements that return different values depending on what is evaluated in the request packets. For example, option 82 suboption evaluating logic 146 may receive packets and values of option 82 suboptions and determine the return value.

These approaches enable clients to selectively request and for the server to filter the data output for an active leasequery request. Further, embodiments enable the server computer to select the type of filter to use, based on the class of the request or based on information local to a specific request/response pair. More broadly, embodiments enable a DHCP server to use active execution of logic in the form of expressions or extensions to define a channel to which a transaction belongs.

Active leasequery channels as disclosed herein also allow definition of filtered output streams that contain only a subset of the information that is normally output to an active leasequery request. The filtered streams may be defined by information previously configured in the DHCP server logic 110 for other reasons, for example, client class. Alternatively, filtered streams may be defined by the active execution of logic using an expression or extension, allowing each individual address binding change to be categorized for possible inclusion or exclusion from a particular channel.

The ability to have a filtered data stream from an active leasequery is useful in many networking domains. For example, a network service provider might direct active leasequery information concerning cable modems to one active leasequery client and might direct information concerning customer premise equipment (CPE) devices to a different active leasequery client.

As another example, a service provider may wish to guard against modem cloning resulting in unauthorized network service; successful prevention requires that an external process is updated with information whenever a DHCP client changes the gateway interface address (giaddr) for the gateway over which the client accesses the DHCP server. Prevention can be accomplished using active leasequery channels with an appropriate expression or extension, without adding custom code to active leasequery logic 114, leasequery logic 112, or DHCP server logic 110.

As another example, a service provider may configure the system to track IP state data only for packetCable media terminal adapters (MTAs), but not for cable modems or PCs, while simultaneously having a separate process obtaining DHCP change data on a different channel for CPE devices from a specific vendor, or tracking lease state for certain IP ranges.

Embodiments also can support filters for binding changes concerning IP addresses that are defined statically based on attributes associated with the IP address. Additionally, active leasequery channel response logic 116 allows active code execution to be associated with each transaction to the IP lease state database to determine if information about a transaction is to be sent over a particular active leasequery data link. Embodiments provide flexibility offered by active execution of function logic 118 or other elements of active leasequery channel response logic 116, which can reference a current request from DHCP client logic 124, as well as save IP address binding information to decide to which channel a transaction belongs. This approach is highly desirable as it allows an algorithm to be specified as a filter rather than a combination of database attributes.

Further, in an embodiment a network service provider is not required to create extensions or custom code to the DHCP server logic 110 to send some form of data stream to another process to try to keep another process up to date with IP address binding changes of the DHCP server. Instead, a network service provider can develop only a Channel Definition String to associate a particular IP address binding database transaction with one or more active leasequery connections to the DHCP server, which is far easier than developing a complex extension that may need to address issues such as multi-threading, fault tolerance, and other complex processing issues. More broadly, embodiments thus have utility for any institution or person who needs to build a data feed from a DHCP server to an external process using active leasequery.

The approaches of FIG. 3, FIG. 4 provide the benefit that the channel determination is made based on a request-response pair, not merely on a request. Therefore, existing expressions or extensions associated with the DHCP server logic 110, which may embody policy for what is contained in the response, can affect the channel determination. Such policy can affect the selection of a channel in addition to data in the client request. Further, timeouts, or leases that expire or are made available through operator action can also result in active leasequery messages (e.g., DHCPLEASEUNASSIGNED); in such a case, the stored channel(s) are used to determine the active leasequery requests that are interested in the lease and are sent the messages. Other lease state transactions or programmatic actions may also cause an active leasequery request.

3.3 Active Leasequery

The following supplemental text describes functions that may be implemented in an embodiment of Active Leasequery Logic 114 of FIG. 1.

```
dhc Working Group                                          Kim Kinnear
Internet Draft                                             Bernie Volz
Intended Status: Standards Track                          Neil Russell
                                                            Mark Stapp
                                                         Cisco Systems Active DHCPv4 Lease Query
             <draft-cisco-dhc-dhcpv4-active-leasequery-00.txt>

Status of this Memo

This Internet-Draft has not yet, at the time of publication, been
   submitted to the IETF.

Internet-Drafts are working documents of the Internet Engineering
   Task Force (IETF), its areas, and its working groups.  Note that
   other groups may also distribute working documents as Internet-
   Drafts.

Internet-Drafts are draft documents valid for a maximum of six months
   and may be updated, replaced, or obsoleted by other documents at any
   time.  It is inappropriate to use Internet-Drafts as reference
   material or to cite them other than as "work in progress."

The list of current Internet-Drafts can be accessed at
   http://www.ietf.org/ietf/1id-abstracts.txt.

The list of Internet-Draft Shadow Directories can be accessed at
   http://www.ietf.org/shadow.html.

This Internet-Draft will expire on September 20, 2009.

Copyright Notice

Copyright (c) 2009 Cisco Systems Incorporated. All rights reserved.

Kinnear                                                       [Page 1]
```

Internet Draft        Active DHCPv4 Lease Query           March 2009

Abstract

The Dynamic Host Configuration Protocol for IPv4 (DHCPv4) has been
   extended with a Leasequery capability that allows a client to request
   information about DHCPv4 bindings. That mechanism is limited to
   queries for individual bindings. In some situations individual
   binding queries may not be efficient, or even possible. In addition,
   continuous update of an external client with Leasequery data is
   sometimes desired. This document expands on the DHCPv4 Leasequery
   protocol, and allows for active transfer of real-time DHCPv4 address
   binding information data via TCP.

Table of Contents

1.   Introduction.................................................... 2
      2.   Terminology..................................................... 3
      3.   Protocol Overview............................................... 5
      4.   Interaction Between Active Leasequery and Bulk Leasequery....   6
      5.   Message and Option Definitions.................................. 7
      5.1. Message Framing for TCP......................................... 7
      5.2. New or Changed Options.......................................... 8
      5.3. Connection and Transmission Parameters......................... 10
      7.   Requestor Behavior............................................. 11
      7.1. Connecting and General Processing.............................. 11
      7.2. Forming an Active Leasequery................................... 12
      7.3. Processing Active Replies...................................... 13
      7.4. Closing Connections............................................ 17
      8.   Server Behavior................................................ 17
      8.1. Accepting Connections.......................................... 17
      8.2. Replying to an Active Leasequery............................... 18
      8.3. Multiple or Parallel Queries................................... 19
      8.4. Closing Connections............................................ 19
      9.   Security Considerations........................................ 20
      10.  IANA Considerations............................................ 20
      11.  Acknowledgements............................................... 21
      12.  References..................................................... 21
      12.1. Normative References.......................................... 21
      12.2. Informative References........................................ 21

1. Introduction

The DHCPv4 Leasequery capability [RFC4388] extends the basic DHCPv4
   capability [RFC2131] [RFC2132] to allow an external entity to query a
   DHCPv4 server to recover lease state information about a particular
   IP address or client in near real-time.

```
Internet Draft         Active DHCPv4 Lease Query           March 2009

Requirements exist for external entities to keep up to date on the
   correspondence between DHCPv4 clients and the IPv4 addresses for
   which they have leases.  These requirements often stem from
   regulatory requirements placed on service providers by governmental
   agencies.

These entities need to keep up with the current IPv4 address binding
   activity of the DHCPv4 server.  Keeping up with address binding
   activity is termed "active" leasequery.

The DHCPv4 Bulk Leasequery [DHCPv4Bulk] capability can be used to
   recover useful information from a DHCPv4 server when some external
   entity starts up.  This entity could be one which is directly
   involved in the DHCPv4 client - server transactions (e.g., a relay
   agent), or it could be an external process which needs information
   present in the DHCPv4 server's lease state database.

The Active Leasequery capability documented here is designed to allow
   an entity not directly involved in DHCPv4 client - server
   transactions to nevertheless keep current with the state of the
   DHCPv4 lease state information in real-time.

2.  Terminology

The key words "MUST", "MUST NOT", "REQUIRED", "SHALL", "SHALL NOT",
   "SHOULD", "SHOULD NOT", "RECOMMENDED", "MAY", and "OPTIONAL" in this
   document are to be interpreted as described in RFC 2119 [RFC2119].

This document uses the following terms:

o  "address binding"

The information that a DHCPv4 server keeps regarding the
         relationship between a DHCPv4 client and an IPv4 IP address.
         This includes the identity of the DHCPv4 client and the
         expiration time, if any, of any lease that client has on a
         particular IPv4 address.

o  "Active Leasequery"

Keeping up to date in real-time (or near real-time) with DHCPv4
         address binding activity.

o  "Bulk Leasequery"

Requesting and receiving the existing DHCPv4 address binding
         information in an efficient manner.

Kinnear                                                       [Page 3]
```

Internet Draft        Active DHCPv4 Lease Query            March 2009 o "catch-up information, catch-up phase"

If a DHCPv4 Active Leasequery requestor sends in a query-start-
    time option in a DHCPACTIVELEASEQUERY message, the DHCPv4 server
    will attempt to send the requestor the information that changed
    since the time specified in the query-start-time option. The
    address binding information sent to satisfy this request is the
    catch-up information, and the period while it is being sent is
    the catch-up phase.

o "clock skew"

The difference between the absolute time on a DHCPv4 server and
    the absolute time on the system where a requestor of an Active
    or Bulk Leasequery is executing is termed the "clock skew" for
    that Active or Bulk Leasequery connection. It is not absolutely
    constant but is likely to vary only slowly. While it is easy to
    think that this can be calculated precisely after one packet is
    received by a requestor from a DHCPv4 server, a more accurate
    value is derived from continuously examining the instantaneous
    value developed from each packet received from a DHCPv4 server
    and using it to make small adjustments to the existing value
    held in the requestor.

o "DHCPv4 client"

A DHCPv4 client is an Internet host using DHCP to obtain
    configuration parameters such as a network address.

o "DHCPv4 relay agent"

A DHCPv4 relay agent is a third-party agent that transfers BOOTP
    and DHCPv4 messages between clients and servers residing on
    different subnets, per [RFC951] and [RFC1542].

o "DHCPv4 server"

A DHCPv4 server is an Internet host that returns configuration
    parameters to DHCPv4 clients.

o "IP address binding"

The information that a DHCPv4 server keeps regarding the
    relationship between a DHCPv4 client and an IPv4 IP address.
    This includes the identity of the DHCPv4 client and the
    expiration time, if any, of any lease that client has on a
    particular IPv4 address.

Internet Draft        Active DHCPv4 Lease Query         March 2009 o "MAC address"

In the context of a DHCP message, a MAC address consists of the
      fields: hardware type "htype", hardware length "hlen", and
      client hardware address "chaddr".

3.  Protocol Overview

The Active Leasequery mechanism is modeled on the existing individual
    Leasequery protocol in [RFC4388] as well as related work on DHCPv4
    Bulk Leasequery [DHCPv4Bulk]; most differences arise from the long
    term nature of the TCP connection required for Active Leasequery.  In
    addition, a DHCPv4 server which supports Active Leasequery MUST
    support Bulk Leasequery [DHCPv4Bulk] as well.

An Active Leasequery client opens a TCP connection to a DHCPv4
    Server, using the DHCPv4 port 67.  Note that this implies that the
    Leasequery client has server IP address(es) available via
    configuration or some other means, and that it has unicast IP
    reachability to the DHCPv4 server.  No relaying for Active Leasequery
    is specified.

After establishing a connection, the client sends an
    DHCPACTIVELEASEQUERY message over the connection.  In response, the
    server sends updates to the requestor using DHCPLEASEACTIVE and
    DHCPLEASEUNASSIGNED messages which are extensions of these messages
    as defined in [RFC4388] and [DHCPv4Bulk].

Active Leasequery is designed to provide continuous updates of DHCPv4
    IPv4 address binding activity to an external entity.

Active Leasequery has features which allow this external entity to
    lose its connection and then reconnect and receive the latest
    information concerning any IP addresses changed while it was not
    connected.

These capabilities are designed to allow the Active Leasequery
    requestor to efficiently become current with respect to the lease
    state database after it has been restarted or the machine on which it
    is running has been reinitialized.  It is easy to define a protocol
    which works when the requestor is always connected to the DHCPv4
    server.  Since that isn't sufficiently robust, much of the mechanism
    in this document is designed to deal efficently with situations that
    occur when the Active Leasequery requestor becomes disconnected from
    the DHCPv4 server from which it is receiving updates and then becomes
    reconnected to that server.

Internet Draft        Active DHCPv4 Lease Query         March 2009

Central to this approach, if the Active Leasequery requestor loses service, it is allowed to specify the time of its most recent update in a subsequent Active Leasequery request and the DHCPv4 server will determine whether or not data was missed while the Active Leasequery requestor was not connected.

The DHCP server processing the Active Leasequery request may limit the amount of data saved, and methods exist for the DHCPv4 server to inform the Active Leasequery requestor that more data was missed than could be saved. In this situation, the Active Leasequery requestor would issue a Bulk Leasequery [DHCPv4Bulk] to recover information not available through an Active Leasequery.

DHCPv4 servers are not required to keep any data corresponding to data missed on a Active Leasequery connection, but will typically choose to keep data corresponding to some recent activity available for subsequent queries by a DHCPv4 Active Leasequery client whose connection was temporarily interrupted.

An Active Leasequery requestor would typically use Bulk Leasequery to initialize its database with all current data when that database contains no address binding information. In addition, it would use Bulk Leasequery to recover missed information in the event that its connection with the DHCPv4 server was lost for a longer time than the DHCPv4 server would keep track of the specific changes to the IP address binding information.

The messages sent by the server in response to an Active Leasequery request SHOULD be identical to the messages sent by the server to a Bulk Leasequery request regarding the way the data is encoded into the Active Leasequery responses. In addition, the actions taken by the Active Leasequery requestor to interpret the responses to an Active Leasequery request SHOULD be identical to the way that the requestor interprets the responses to a Bulk Leasequery request. Thus, the handling of time, clock skew, data source, and other items discussed in the Bulk Leasequery specification [DHCPv4Bulk] are to be followed when implementing Active Leasequery.

4.  Interaction Between Active Leasequery and Bulk Leasequery

Active Leasequery can be seen as an extension of the Bulk Leasequery protocol [DHCPv4Bulk]. The contents of packets returned to an Active Leasequery requestor are identical to that defined for the Bulk Leasequery protocol [DHCPv4Bulk].

Applications which employ Active Leasequery to keep a database up to date with respect to the DHCPv4 server's lease state database will Internet Draft          Active DHCPv4 Lease Query          March 2009 usually use an initial Bulk Leasequery to bring their database into
   equivalence with that of the DHCPv4 server, and then use Active
   Leasequery to keep that database current with respect to the DHCPv4
   server's lease state database.

There are several differences between the Active and Bulk Leasequery
   protocols. Active Leasequery defines only one qualifier (the query-
   start-time) and no query types, while Bulk Leasequery defines several
   of query types and qualifiers. An Active Leasequery connection sends
   all available updates to the requestor.

An Active Leasequery connection does not ever "complete", though the
   DHCPv4 server may drop the connection for a variety of reasons
   associated with some sort of exception condition.

5. Message and Option Definitions 5.1. Message Framing for TCP

The use of TCP for the Active Leasequery protocol permits one or more
   DHCPv4 messages to be sent at a time. The receiver needs to be able
   to determine how large each message is. The same framing techique
   used for Bulk Leasequery [DHCPv4Bulk] is used for Active Leasequery.

Two octets containing the message size in network byte-order are
   prepended to each DHCPv4 message sent on an Active Leasequery TCP
   connection. The two message-size octets 'frame' each DHCPv4 message.

DHCPv4 message framed for TCP:

Internet Draft        Active DHCPv4 Lease Query         March 2009

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|        message-size           |     op (1)    |   htype (1)   |
+-+-+-+-+-+-+-+-+-+-+-+-+-+-+-+-+-+-+-+-+-+-+-+-+-+-+-+-+-+-+-+-+
|    hlen (1)   |    hops (1)   |         ....                  |
+---------------+---------------+                               +
|                                                               |
.              remainder of DHCPv4 message,                     .
.                 from Figure 1 of [RFC2131]                    .
.                                                               .
.                        (variable)                             .
|                                                               |
+-+-+-+-+-+-+-+-+-+-+-+-+-+-+-+-+-+-+-+-+-+-+-+-+-+-+-+-+-+-+-+-+
``` message-size   the number of octets in the message that
                        follows, as a 16-bit integer in network
                        byte-order.

All other fields are as specified in DHCPv4 [RFC2131].

Figure 1:  Format of a DHCPv4 message in TCP

The intent in using this format is that code which currently knows
how to deal with a message returned from DHCPv4 Leasequery [RFC4388]
will be able to deal with the message held inside of the TCP framing.

5.2.  New or Changed Options

The existing messages DHCPLEASEUNASSIGNED and DHCPLEASEACTIVE are
   used as the value of the dhcp-message-type option to indicate an IP
   address which is currently not leased or currently leased to a DHCPv4
   client, respectively.

All of the message types and options defined for Bulk Leasequery
   [DHCPv4Bulk] are also used by Active Leasequery.  In addition, new
   message types and option types are defined for Active Leasequery, as
   described below.

5.2.1.  dhcp-message-type

The message type option (option 53) from [RFC2132] requires
   additional values.  The values of these message types are shown below Internet Draft        Active DHCPv4 Lease Query         March 2009 in an extension of the table from Section 9.6 of [RFC2132]:

```
    Value   Message Type
    -----   ------------
      16    DHCPACTIVELEASEQUERY
      17    DHCPLEASEQUERYSTATUS
```

5.2.2.  dhcp-status-code

The dhcp-status-code option defined in [DHCPv4Bulk] allows greater
detail to be returned regarding the status of a DHCP request.  While
specified in the Bulk Leasequery document, this DHCPv4 option is also
used in Active Leasequery.

This option has two possible scopes when used with Active Leasequery,
depending on the context in which it appears.  It refers to the
information in a single leasequery reply if the value of the dhcp-
message-type is DHCPLEASEACTIVE or DHCPLEASEUNASSIGNED.  It refers to
the message stream related to an entire request if the value of the
dhcp-message-type is DHCPLEASEQUERYSTATUS.

Additional status codes defined for support of Active Leasequery are:

```
    Name            status-code     Description
    ----            -----------     -----------

DataMissing        005  Indicates that IP address binding information
                            requested is not available.

ConnectionActive   006  Indicates that this connection remains
                            active.

CatchUpComplete    007  Indicates that this Active Leasequery
                            connection has completed sending all of the
                            saved data requested.
```

A dhcp-status-code option MAY appear in the options field of a DHCP
message.  If the dhcp-status-code option does not appear, it is
assumed that the operation was successful.  The dhcp-status-code
option SHOULD NOT appear in a message which is successful unless it
is needed to convey some text message along with the Success status
code.

```
Internet Draft        Active DHCPv4 Lease Query          March 2009
```

5.3. Connection and Transmission Parameters

```
   DHCPv4 servers that support Active Leasequery SHOULD listen for
   incoming TCP connections on the DHCPv4 server port 67.
   Implementations MAY offer to make the incoming port configurable, but
   port 67 MUST be the default.  Requestors SHOULD make TCP connections
   to port 67, and MAY offer to make the destination server port
   configurable.

This section presents a table of values used to control Active
   Leasequery behavior, including recommended defaults.  Implementations
   MAY make these values configurable.  However, configuring too-small
   timeout values may lead to harmful behavior both to this application
   as well as to other traffic in the network.  As a result, timeout
   values smaller than the default values are NOT RECOMMENDED.

Parameter                 Default   Description
   ------------------------------------------------------------
   BULK_LQ_DATA_TIMEOUT       300 secs  Bulk Leasequery data timeout
   BULK_LQ_MAX_CONNS          10        Max Bulk Leasequery TCP connections
   ACTIVE_LQ_RCV_TIMEOUT      120 secs  Active Leasequery receive timeout
   ACTIVE_LQ_SEND_TIMEOUT     120 secs  Active Leasequery send timeout
   ACTIVE_LQ_IDLE_TIMEOUT     60 secs   Active Leasequery idle timeout
```

6. Information Communicated by Active Leasequery

```
   While the information communicated by a Bulk Leasequery [DHCPv4Bulk]
   is taken directly from the DHCPv4 server's lease state database, the
   information communicated by an Active Leasequery is real-time
   information.  As such, it is the information which is currently
   associated with a particular IP address in the DHCPv4 server's lease
   state database.

This is of significance, because if the Active Leasequery requestor
   runs slowly or the requestor disconnects from the DHCPv4 server and
   then reconnects with a query-start-time (signalling a catch-up
   operation), the information communicated to the Active Leasequery
   requestor is only the most current information from the DHCPv4
   server's lease state database.

The requestor of an Active Leasequery MUST NOT assume that every
   lease state change is communicated across an Active Leasequery
   connection.  Even if the Active Leasequery requestor remains
   connected, the DHCPv4 server is only required to transmit information
```

Internet Draft        Active DHCPv4 Lease Query         March 2009 about an IP address that is current when the packet is created and
   handed off to the TCP stack to send to the requestor.

If the TCP connection blocks and the DHCPv4 server is waiting to send
   information down the connection, when the connection becomes
   available to be written the DHCPv4 server MAY create the packet to
   send at this time.  The current state of the IP address will be sent,
   and any transition in state or other information that occurred while
   the TCP connection was blocked will be lost.

Thus, the Active Leasequery protocol does not allow the requestor to
   build a complete history of every activity on every lease.  An
   effective history of the important state changes for a lease can be
   created if the parameters of the DHCPv4 server are tuned to take into
   account the requirements of an Active Leasequery requestor.  For
   instance, the period after the expiration or release of an IP address
   could be configured long enough (say several minutes, well more than
   the receive timeout), so that an Active Leasequery requestor would
   never miss any changes in the client to IP address binding.

7.  Requestor Behavior 7.1.  Connecting and General Processing

A Requestor attempts to establish a TCP connection to a DHCPv4 Server
   in order to initiate a Leasequery exchange.  If the attempt fails,
   the Requestor MAY retry.

If an Active Leasequery is terminated prematurely by a
   DHCPLEASEQUERYDONE with a dhcp-message status-code of QueryTerminated
   or by the failure of the connection over which it was being
   submitted, the requestor MAY retry the request after the creation of
   a new connection.

Messages from the DHCPv4 server come as multiple responses to a
   single DHCPACTIVELEASEQUERY message.  Thus, each DHCPACTIVELEASEQUERY
   or DHCPBULKLEASEQUERY request MUST have an xid (transaction-id)
   unique on the connection on which it is sent, and all of the messages
   which come as a response to it all contain the same xid as the
   request.  It is the xid which allows the data-streams of two or more
   different DHCPACTIVELEASEQUERY or DHCPBULKLEASEQUERY requests to be
   demultiplexed by the requestor.

A requestor MAY send a DHCPACTIVELEASEQUERY request to a DHCPv4
   server and immediately close the transmission side of its TCP
   connection, and then read the resulting response messages from the
   DHCPv4 server.  This is not required, and the usual approach is to leave both sides of the TCP connection up until at least the
conclusion of the Active Leasequery.

7.2. Forming an Active Leasequery

The Active Leasequery is designed to create a long lived connection
between the requestor and the DHCPv4 server processing the active
query. The DHCPv4 server will send IPv4 address binding information
back across this connection with minimal delay after it learns of the
binding information. It will learn about IPv4 address bindings
either because it makes the bindings itself or because it has
received information about a binding from another server.

To form the Active query, a DHCPv4 request is constructed with a
dhcp-message-type of DHCPACTIVELEASEQUERY. This DHCPv4 request MUST
NOT have a ciaddr, a chaddr, or a dhcp-client-identifier. The DHCPv4
request MUST contain a transaction-id, and that transaction-id MUST
BE locally unique to the TCP connection to the DHCPv4 server. The
DHCPv4 request SHOULD have a dhcp-parameter-request-list to inform
the DHCPv4 server which DHCPv4 options are of interest to the
requestor sending the DHCPACTIVELEASEQUERY message.

An important capability of the Active Leasequery is the ability of
the requestor to specify that some recent data be sent immediately to
the requestor in parallel with the transmission of the ongoing IPv4
address binding information in more or less real time. This
capability is used in order to allow an Active Leasequery requestor
to recover missed information in the event that it temporarily loses
connectivity with the DHCPv4 server processing a previous Active
Leasequery.

Note that until all of the recent data (catch-up data) has been
received, the requestor MUST NOT keep track of the base time received
in Leasequery reply messages to use later in a subsequent Bulk
Leasequery or Active Leasequery request.

This capability is enabled by the transmission of a 4 octet base-time
option with each Leasequery reply sent as the result of a previous
Active Leasequery. The requestor will typically keep track of the
highest base-time received from a particular DHCPv4 server over an
Active Leasequery connection, and in the event that the requestor
finds it necessary (for whatever reason) to reestablish an Active
Leasequery connection to that DHCPv4 server, the requestor will place
this highest base-time value into a query-start-time option in the
new DHCPACTIVELEASEQUERY request.

If the requestor doesn't wish to request an update of information
missed when it was not connected to the DHCPv4 server, then it does Internet Draft        Active DHCPv4 Lease Query           March 2009 not include the query-start-time option in the DHCPACTIVELEASEQUERY
   request.

If the TCP connection becomes blocked or stops being writable while
   the requestor is sending its query, the requestor SHOULD be prepared
   to terminate the connection after BULK_LQ_DATA_TIMEOUT.  We make this
   recommendation to allow requestors to control the period of time they
   are willing to wait before abandoning a connection, independent of
   notifications from the TCP implementations they may be using.

7.3. Processing Active Replies

The Requestor attempts to read a DHCPv4 leasequery reply message from
   the TCP connection.  If the stream of replies becomes blocked, the
   Requestor SHOULD be prepared to terminate the connection after
   ACTIVE_LQ_RCV_TIMEOUT, and MAY begin retry processing if configured
   to do so.

Note that a DHCPACTIVELEASEQUERY request specifically requests the
   DHCPv4 server to create a long-lived connection which may not have
   data transferring continuously during its lifetime.  Therefore the
   DHCPv4 server will send a DHCPLEASEQUERYSTATUS message with a dhcp-
   status-code of ConnectionActive every ACTIVE_LQ_IDLE_TIMEOUT seconds
   (default 60) in order for the requestor to know that the connection
   remains alive.  Note that the default for ACTIVE_LQ_RCV_TIMEOUT is
   120 seconds, twice the value of the ACTIVE_LQ_IDLE_TIMEOUT's default
   of 60 seconds which drives the DHCPv4 server to send messages.  Thus
   ACTIVE_LQ_RCV_TIMEOUT controls how sensitive the requestor is to be
   to delays by the DHCPv4 server in sending updates or
   DHCPLEASEQUERYSTATUS messages.

A successful query that is returning binding data MUST include a
   non-zero ciaddr.  It may also include a non-zero chaddr, htype, and
   hlen as well as additional options.  If there are additional bindings
   to be returned, they will be carried in additional Active Leasequery
   messages.

Any requestor of an Active Leasequery operation MUST be prepared to
   receive multiple copies of the IPv4 address binding information for a
   particular IPv4 address.  See the Bulk Leasequery draft [DHCPv4Bulk]
   for information on how to deal with this situation.

A single Active Leasequery can and usually will result in a large
   number of replies.  The Requestor MUST be prepared to receive more
   than one reply with transaction-ids matching a single
   DHCPACTIVELEASEQUERY message from a single DHCPv4 server.

A DHCPACTIVELEASEQUERY has two regimes -- during the catch-up phase, if any, and after any catch-up phase. During the catch-up phase (if
one exists), the data returned in the base-time option in a
DHCPLEASEACTIVE or DHCPLEASEUNASSIGNED message may appear to be
ordered, but the most recent change in the lease state data being
returned is not related to the base-time option value in the
messages. Another way to say this is that the ordering of the
updates sent by the DHCPv4 server during the catch-up phase is
independent of the ordering in the changes in the lease state data.
The base-time option from messages during this phase MUST NOT be
saved and used in a subsequent DHCPACTIVELEASEQUERY message's query-
start-time option as it does not represent the extent of progress of
the catch-up activity.

After the catch-up phase, or during the entire series of messages
received as the response to a DHCPACTIVELEASEQUERY request with no
query-start-time (and therefore no catch-up phase), the base-time
option of the most recent message SHOULD be saved as a record of the
most recent time that data was received. This base-time (in the
context of the DHCPv4 server) can be used in a subsequent
DHCPACTIVELEASEQUERY message's query-start-time, or in a
DHCPBULKLEASEQUERY message's query-start-time if one is required,
after a loss of the Active Leasequery connection.

The DHCPLEASEQUERYSTATUS message MAY unilaterally terminate a
successful DHCPACTIVELEASEQUERY request which is currently in
progress in the event that the DHCPv4 server determines that it
cannot continue processing a DHCPACTIVELEASEQUERY request. For
example, when a server is requested to shut down it SHOULD send a
DHCPLEASEQUERYSTATUS message with a dhcp-status-code of
QueryTerminated, and then close the connection.

After receiving DHCPLEASEQUERYSTATUS with a QueryTerminated status
from a server, the Requestor MAY close the TCP connection to that
server.

The DHCPv4 Leasequery protocol uses the associated-ip option as an
indicator that multiple bindings were present in response to a single
client based query. For Active Leasequery, client-based queries are
not supported and so the associated-ip option is not used, and MUST
NOT be present in replies.

7.3.1. Processing Replies from a Request Containing a query-start-time

If the DHCPACTIVELEASEQUERY was requested with a query-start-time,
the DHCPv4 server will attempt to send information about all IP
address bindings that changed since the time specified in the query-
start-time. This is the catch-up phase of the DHCPACTIVELEASEQUERY processing.  The DHCPv4 server MAY also begin immediate updates over
the same connection of real-time IP address binding information
changes.  Thus, the catch-up phase may run in parallel with the
normal updates generated by the DHCPACTIVELEASEQUERY request.

A DHCPv4 server MAY keep only a limited amount of time ordered
information available to respond to a DHCPACTIVELEASEQUERY request
containing a query-start-time.  Thus, it is possible that the time
specified in the query-start-time represents a time not covered by
the time ordered information kept by the DHCPv4 server.  If this
should occur, and there is not enough data saved in the DHCPv4 server
to satisfy the request specified by the query-start-time option, the
DHCPv4 server will reply immediately with a DHCPLEASEQUERYSTATUS
message with a dhcp-status-code of DataMissing with a base-time
option equal to the server's current time.  This will signal the end
of the catch-up phase, and the only updates that will subsequently be
received on this connection are the real-time updates from the
DHCPACTIVELEASEQUERY request.

If there is enough data saved to satisfy the request, then
DHCPLEASEACTIVE and DHCPLEASEUNASSIGNED messages will begin arrive
from the DHCPv4 server.  Some of these messages will be related to
the query-start-time request and be part of the catch-up phase.  Some
of these messages will be real-time updates of IP address binding
changes taking place in the DHCPv4 server.  In general, there is no
way to determine the source each message.

Until the catch-up phase is complete, the latest base-time value
received from a DHCPv4 server processing an Active Leasequery request
cannot be reset from the incoming messages because to do so would
compromise the ability to recover lost information if the
DHCPACTIVELEASEQUERY were to terminate prior to the completion of the
catch-up phase.

The requestor will know that the catch-up phase is complete because
the DHCPv4 server will transmit a DHCPLEASEQUERYSTATUS message with
the dhcp-status-code of CatchUpComplete.  Once this message is
transmitted, all additional DHCPLEASEACTIVE and DHCPLEASEUNASSIGNED
messages will relate to real-time ("new") IP address binding changes
in the DHCPv4 server.

As discussed in Section 6.3, the requestor SHOULD keep track of the
latest base-time option value received over a particular connection,
to be used in a subsequent DHCPACTIVELEASEQUERY request -- but only
if the catch-up phase is complete.  Prior to the completion of the
catch-up phase, if the connection should go away or if the requestor
receives a DHCPLEASEQUERYDONE message, then when it reconnects it
MUST use the base-time value from the previous connection and not any Internet Draft        Active DHCPv4 Lease Query        March 2009 base-time value received from the recently closed connection.

In the event that there was enough data available to the DHCPv4 server to begin to satisfy the request implied by the query-start-time option, but during the processing of that data the server found that it was unable to continue (perhaps there was barely enough, the connection is very slow, and the aging algorithm causes the saved data to become unavailable) the DHCPv4 server will terminate the catch-up phase of processing immediately by sending a DHCPLEASEQUERYSTATUS message with a dhcp-status-code of DataMissing and with a base-time option of the current time.

The requestor MUST NOT assume that every individual state change of every IP address during the period from the time specified in the query-start-time and the present is replicated in an Active Leasequery reply message. The requestor MAY assume that at least one Active Leasequery reply message will exist for every IP address which had one or more changes of state during the period specified by the query-start-time and the current time. The last message for each IP address will contain the state at the current time, and there may be one or more messages concerning a single IP address during the catch-up phase of processing.

If an IP address changed state multiple times during the time that the requestor was not connected (that is, during the time from the query-start-time and the present), then only the current IP address binding information will be sent during the catch-up phase. However, the requestor MUST NOT assume that every intermediate state change that occurred during the period from the query-start-time to the present will be represented by an individual Leasequery message.

If the DHCPLEASEQUERYSTATUS message containing a dhcp-status-code of DataMissing is received and the requestor is interested in keeping its database up to date with respect to the current state of IP address bindings in the DHCPv4 server, then the requestor SHOULD issue a DHCPBULKLEASEQUERY request to recover the information missing from its database. This DHCPBULKLEASEQUERY should include a query-start-time, set to be the same as its query-start-time previously included in the DHCPACTIVELEASEQUERY responses from the DHCPv4 server, and a query-end-time equal to the base-time returned by the DHCPv4 server in the DHCPLEASEQUERYSTATUS message with the dhcp-status-code of DataMissing.

In the event that the requestor receives a DHCPLEASEQUERYSTATUS message with a dhcp-status-code of DataMissing, it is a reasonable assumption that it is interested in keeping its database up to date with respect to the DHCPv4 server's internal IP address binding database or it would not have included the query-start-time in the DHCPACTIVELEASEQUERY message.

Typically, the requestor would have one connection open to a DHCPv4
server for a DHCPACTIVELEASEQUERY request and possibly one additional
connection open for a DHCPBULKLEASEQUERY request to the same DHCPv4
server to fill in the data that might have been missed prior to the
initiation of the DHCPACTIVELEASEQUERY.  The Bulk Leasequery
connection would typically run to completion and be closed, leaving
one Active Leasequery connection open to a single DHCPv4 server.
Alternatively, both requests could be issued over a single
connection.

7.4. Closing Connections

The Requestor or DHCPv4 leasequery server MAY close its end of the
TCP connection at any time.  The Requestor MAY choose to retain the
connection if it intends to issue additional queries.  Note that this
client behavior does not guarantee that the connection will be
available for additional queries: the server might decide to close
the connection based on its own configuration.

8. Server Behavior

A DHCPv4 server which supports Active Leasequery MUST support Bulk
Leasequery [DHCPv4Bulk] as well.

8.1. Accepting Connections

Servers that implement DHCPv4 Active Leasequery listen for incoming
TCP connections.  Port numbers are discussed in Section 5.3.  Servers
MUST be able to limit the number of currently accepted and active
connections.  The value BULK_LQ_MAX_CONNS MUST be the default;
implementations MAY permit the value to be configurable.  Connections
SHOULD be accepted and, if the number of connections is over
BULK_LQ_MAX_CONNS, they SHOULD be closed immediately.

Servers MAY restrict Active Leasequery connections and
DHCPACTIVELEASEQUERY messages to certain clients.  Connections not
from permitted clients SHOULD be closed immediately, to avoid server
connection resource exhaustion.

If the TCP connection becomes blocked while the server is accepting a
connection or reading a query, it SHOULD be prepared to terminate the
connection after an BULK_LQ_DATA_TIMEOUT.  We make this
recommendation to allow servers to control the period of time they
are willing to wait before abandoning an inactive connection,
independent of the TCP implementations they may be using.

Internet Draft         Active DHCPv4 Lease Query            March 2009

8.2. Replying to an Active Leasequery

If the connection becomes blocked while the server is attempting to
   send reply messages, the server SHOULD be prepared to terminate the
   TCP connection after ACTIVE_LQ_SEND_TIMEOUT. This timeout governs how
   much congestion the DHCPv4 server is prepared to tolerate over any
   Active Leasequery connection. The default is two minutes, which means
   that if more than two minutes goes by without the requestor reading
   enough information to unblock the TCP connection, the DHCPv4 server
   will drop the TCP connection.

If the DHCPv4 server encounters an error during processing of the
   DHCPACTIVELEASEQUERY message, either during initial processing or
   later during the message processing, it SHOULD send a
   DHCPLEASEQUERYSTATUS containing an error code of some kind in a
   dhcp-status-code option. It SHOULD close the connection after this
   error is signalled.

Every reply to a DHCPACTIVELEASEQUERY request MUST contain the
   information specified in replies to a DHCPBULKLEASEQUERY request
   [DHCPv4Bulk].

If a DHCPACTIVELEASEQUERY request contains a query-start-time option,
   it indicates that the requestor would like the DHCPv4 server to send
   it not only messages that correspond to DHCPv4 address binding
   activity that occurs subsequent to the receipt of the DHCPLEASEACTIVE
   request, but also messages that correspond to DHCPv4 address binding
   activity that occurred prior to the DHCPACTIVELEASEQUERY request.

If a query-end-time option appears in a DHCPACTIVELEASEQUERY the
   DHCPv4 server should send a DHCPLEASEQUERYSTATUS message with a
   dhcp-status-code of MalformedQuery and terminate the connection.

In order to implement a meaningful response to this query, the DHCPv4
   server MAY keep track of the address binding activity and associate
   changes with particular base-time values from the messages.  Then,
   when requested to do so by a DHCPACTIVELEASEQUERY request containing
   a query-start-time option, the DHCPv4 server can respond with replies
   for all address binding activity occurring on that query-start-time
   or later times.

These replies based on the query-start-time MAY be interleaved with
   the messages generated due to current IP address binding activity.

Once the transmission of the DHCPv4 Leasequery messages associated
   with the query-start-time option are complete, a DHCPLEASEQUERYSTATUS
   message MUST be sent with a dhcp-status-code value of Internet Draft          Active DHCPv4 Lease Query          March 2009

CatchUpComplete.

The DHCPv4 server SHOULD but is not required to keep track of a
   limited amount of previous address binding activity and associate it
   with base-time values.  The DHCPv4 server MAY choose to only do this
   in the event that it has received at least one DHCPACTIVELEASEQUERY
   request in the past, as to do so will almost certainly entail some
   utilization of resources which would be wasted if there are no
   DHCPACTIVELEASEQUERY clients for this DHCPv4 server.  The DHCPv4
   server SHOULD make the amount of previous address binding activity it
   retains configurable.  There is no requirement on the DHCPv4 server
   to retain this information over a server restart (or even to retain
   such information at all).

Unless there is an error or some requirement to cease processing a
   DHCPACTIVELEASEQUERY request yielding a DHCPLEASEQUERYSTATUS message,
   there will be no DHCPLEASEQUERYSTATUS message at the conclusion of
   the DHCPACTIVELEASEQUERY processing because that processing will not
   conclude but will continue until either the client or the server
   drops the connection.

8.3.  Multiple or Parallel Queries

Requestors may want to use an existing connection if they need to
   make multiple queries.  Servers MAY support reading and processing
   multiple queries from a single connection.  A server MUST NOT read
   more query messages from a connection than it is prepared to process
   simultaneously.

Typically, a requestor of a Active Leasequery would not need to send
   a second Active Leasequery while the first is still active.  However,
   sending an Active Leasequery and a Bulk Leasequery over the same
   connection would be possible and reasonable.

This MAY be a feature that is administratively controlled.  Servers
   that are able to process queries in parallel SHOULD offer
   configuration that limits the number of simultaneous queries
   permitted from any one requestor, in order to control resource use if
   there are multiple requestors seeking service.

8.4.  Closing Connections

The server MAY close its end of the TCP connection after sending its
   last message, a DHCPLEASEQUERYSTATUS message in response to a query.
   Alternatively, the server MAY retain the connection and wait for
   additional queries from the client.  The server SHOULD be prepared to
   limit the number of connections it maintains, and SHOULD be prepared
   to close idle connections to enforce the limit.

Internet Draft           Active DHCPv4 Lease Query            March 2009

The server MUST close its end of the TCP connection if it encounters
   an error sending data on the connection.  The server MUST close its
   end of the TCP connection if it finds that it has to abort an in-
   process request.  A server aborting an in-process request SHOULD
   attempt to signal that to its clients by using the QueryTerminated
   status code in the dhcp-status-code option in a DHCPLEASEQUERYSTATUS
   message.  If the server detects that the client end has been closed,
   the server MUST close its end of the connection after it has finished
   processing any outstanding requests.

9. Security Considerations

The "Security Considerations" section of [RFC2131] details the
   general threats to DHCPv4.  The DHCPv4 Leasequery specification
   [RFC4388] describes recommendations for the Leasequery protocol,
   especially with regard to relayed LEASEQUERY messages, mitigation of
   packet-flooding DOS attacks, restriction to trusted clients, and use
   of IPsec [RFC2401].

The use of TCP introduces some additional concerns.  Attacks that
   attempt to exhaust the DHCPv4 server's available TCP connection
   resources, such as SYN flooding attacks, can compromise the ability
   of legitimate clients to receive service.  Malicious clients who
   succeed in establishing connections, but who then send invalid
   queries, partial queries, or no queries at all also can exhaust a
   server's pool of available connections.  We recommend that servers
   offer configuration to limit the sources of incoming connections,
   that they limit the number of accepted connections and the number of
   in-process queries from any one connection, and that they limit the
   period of time during which an idle connection will be left open.

10. IANA Considerations

IANA is requested to assign the following new values for this
   document.  See Section 5.2 for details.

1. A dhcp-message-type of 16 for DHCPACTIVELEASEQUERY.

2. A dhcp-message-type of 17 for DHCPLEASEQUERYSTATUS.

3. Values for dhcp-status-code:

Name                status-code
            ----                -----------
            DataMissing         005
            ConnectionActive    006
            CatchUpComplete     007

Internet Draft         Active DHCPv4 Lease Query            March 2009

11. Acknowledgements

The ideas in this document came in part from work in DHCPv6 and
   DHCPv4 Bulk Leasequery as well as from in depth discussions between
   the authors.

12. References 12.1. Normative References

[RFC2119] Bradner, S., "Key words for use in RFCs to Indicate
      Requirement Levels", RFC 2119, March 1997.

[RFC2131] Droms, R., "Dynamic Host Configuration Protocol", RFC 2131,
      March 1997.

[RFC4388] Woundy, R., Kinnear, K., "Dynamic Host Configuration
      Protocol (DHCP) Leasequery", RFC 4388, February 2006.

12.2. Informative References

[RFC951] Croft, B., Gilmore, J., "Bootstrap Protocol (BOOTP)", RFC
      951, September 1985.  :XP [RFC1542] Wimer, W., "Clarifications and
      Extensions for the Bootstrap Protocol", RFC 1542, October 1993.

[RFC2132] Alexander, S., Droms, R., "DHCP Options and BOOTP Vendor
      Extensions", RFC 2132, March 1997.

[DHCPv4Bulk] Kinnear, K., Volz, B., Russell, N., Stapp, M., Rao,
      D.,Joshi B., Kurapati, P., "DHCPv4 Bulk Leasequery", draft-ietf-
      dhc-dhcpv4-bulk-leasequery-00.txt, February 2009.

Authors' Addresses

Kim Kinnear
      Cisco Systems
      1414 Massachusetts Ave.
      Boxborough, Massachusetts 01719

Phone: (978) 936-0000

EMail: kkinnear@cisco.com

```
Internet Draft         Active DHCPv4 Lease Query              March 2009

Bernie Volz
       Cisco Systems
       1414 Massachusetts Ave.
       Boxborough, Massachusetts 01719

Phone: (978) 936-0000

EMail: volz@cisco.com

Neil Russell
       Cisco Systems
       1414 Massachusetts Ave.
       Boxborough, Massachusetts 01719

Phone: (978) 936-0000

EMail: nrussell@cisco.com

Mark Stapp
       Cisco Systems
       1414 Massachusetts Ave.
       Boxborough, Massachusetts 01719

Phone: (978) 936-0000

EMail: mjs@cisco.com
```

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
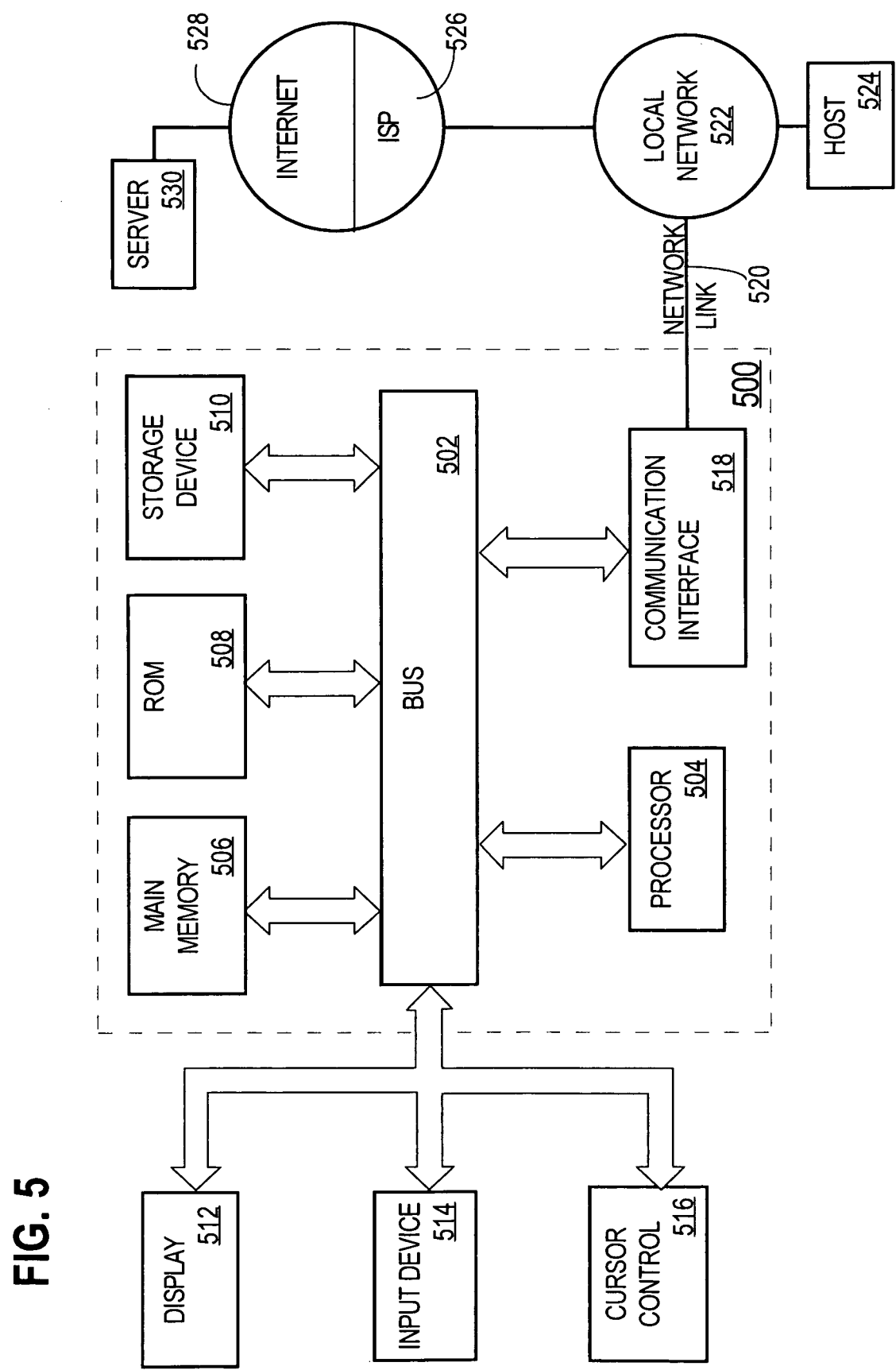
FIG. 5 illustrates a computer system with which embodiments may be used.

For example, FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), plasma or other flat panel display, or cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

5.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A data processing apparatus, comprising:
one or more electronic digital processors;
Dynamic Host Configuration Protocol (DHCP) server logic coupled to the one or more processors;
an active leasequery channel response logic coupled to the DHCP server logic which when executed causes the one or more processors to perform:
receiving, from a particular DHCP client among a plurality of DHCP clients, an active leasequery initiation message requesting the DHCP server logic to actively send update messages about changes in network address leases that the DHCP server logic manages;
wherein the active leasequery initiation message comprises a channel identifier value;
wherein the channel identifier value indicates a particular class of two or more DHCP clients, of the plurality of DHCP clients, wherein the two or more DHCP clients in the particular class of DHCP clients share a same set of attributes;
determining whether the channel identifier value matches a client class that the DHCP server logic manages;
in response to determining that the channel identifier value does match a client class identifier that the DHCP server logic manages, sending, to the particular DHCP client, a plurality of DHCP response messages describing any changes in network address leases that the DHCP server logic performs only for the particular class of the DHCP clients that are in the matched client class;
wherein each of the plurality of DHCP response messages is sent in response to the single active leasequery initiation message comprising the channel identifier value indicating the particular class of DHCP clients, and the single active leasequery initiation message is received by a unicast address.

2. The apparatus of claim 1,
further comprising a storage device coupled to the DHCP server logic and configured to store data defining a plurality of request-response pairs comprising corresponding DHCP client request messages and DHCP server response messages;
wherein the logic is further configured to perform, in response to determining that the channel identifier value does not match any client class identifier that is stored in association with the DHCP server logic:
evaluating a stored functional expression against all of the request-response pairs;
creating, as output from the functional expression, a plurality of definitions of zero or more channels;
storing each of the definitions with corresponding address lease data;
selecting a particular definition that matches the channel identifier value;
for each network address that is associated with one of the request-response pairs that is associated with the particular definition, sending, to the particular DHCP client, one or more DHCP response messages describing any changes in network address leases that the DHCP server logic performs for that network address.

3. The apparatus of claim 2, wherein the functional expression comprises functional logic configured to access one or more fields of a DHCP packet, to perform one or more conditional evaluations based on values of the fields, and to generate a return value based on the evaluations.

4. The apparatus of claim 1, wherein the DHCP client request messages may be comprised of DHCPACTIVELEASEQUERY messages; wherein the DHCP server response messages comprise any of DHCPLEASEACTIVE, DHCPLEASEUNASSIGNED and DHCPLEASEQUERYSTATUS messages.

5. The apparatus of claim 1, wherein the logic is further configured to perform, in response to determining that the channel identifier value does not match any client class identifier that is stored in association with the DHCP server logic:
processing all request-response pairs that are stored in association with the DHCP server logic using DHCP server extension logic;
creating, as output from the DHCP server extension logic, a plurality of definitions of zero or more channels;
storing each of the definitions with corresponding address lease data;
selecting a particular definition that matches the channel identifier value;
for each network address that is associated with one of the request-response pairs that is associated with the particular definition, sending, to the particular DHCP client, one or more DHCP response messages describing any changes in network address leases that the DHCP server logic performs for that network address.

6. The apparatus of claim 1, wherein the DHCP response messages comprise IP address binding information retrieved from an IP lease status database of the DHCP server logic.

7. The apparatus of claim 2, wherein each of the DHCP response messages is any of a DHCPLEASEACTIVE message and a DHCPLEASEUNASSIGNED message.

8. The apparatus of claim 1, wherein the DHCP server logic manages Internet protocol version 6 (IPv6) network addresses.

9. The apparatus of claim 2, wherein the functional expression when executed causes evaluating DHCPDISCOVER request packets against option 82 suboptions or other DHCP options and return different values depending on what is evaluated in the request packets.

10. A non-transitory computer-readable storage medium storing one or more sequences of instructions which when executed cause one or more electronic digital processors to perform:
- initiating operation of a Dynamic Host Configuration Protocol (DHCP) server logic;
- receiving, from a particular DHCP client among a plurality of DHCP clients, an active leasequery initiation message requesting the DHCP server logic to actively send update messages about changes in network address leases that the DHCP server logic manages;
- wherein the active leasequery initiation message comprises a channel identifier value;
- wherein the channel identifier value indicates a particular class of two or more DHCP clients, of the plurality of DHCP clients, wherein the two or more DHCP clients in the particular class of DHCP clients share a same set of attributes;
- determining whether the channel identifier value matches a client class that the DHCP server logic manages;
- in response to determining that the channel identifier value does match a client class identifier that the DHCP server logic manages, sending, to the particular DHCP client, a plurality of DHCP response messages describing any changes in network address leases that the DHCP server logic performs only for the particular class of the DHCP clients that are in the matched client class;
- wherein each of the plurality of DHCP response messages is sent in response to the single active leasequery initiation message comprising the channel identifier value indicating the particular class of DHCP clients, and the single active leasequery initiation message is received by a unicast address.

11. The computer-readable storage medium of claim 10, further comprising
- instructions which when executed cause:
- receiving data defining a plurality of request-response pairs comprising corresponding DHCP client request messages and DHCP server response messages;
- in response to determining that the channel identifier value does not match any client class identifier that is stored in association with the DHCP server logic:
- evaluating a stored functional expression against all of the request-response pairs;
- creating, as output from the functional expression, a plurality of definitions of zero or more channels;
- storing each of the definitions with corresponding address lease data;
- selecting a particular definition that matches the channel identifier value;
- for each network address that is associated with one of the request-response pairs that is associated with the particular definition, sending, to the particular DHCP client, one or more DHCP response messages describing any changes in network address leases that the DHCP server logic performs for that network address.

12. The computer-readable storage medium of claim 11, wherein the functional expression comprises functional logic configured to access one or more fields of a DHCP packet, to perform one or more conditional evaluations based on values of the fields, and to generate a return value based on the evaluations.

13. The computer-readable storage medium of claim 11, wherein the DHCP client request messages may be comprised of DHCPACTIVELEASEQUERY messages; wherein the DHCP server response messages comprise any of DHCPLEASEACTIVE, DHCPLEASEUN ASSIGNED, and DHCPLEASEQUERYSTATUS messages.

14. The computer-readable storage medium of claim 10, wherein the instructions are is further configured to cause performing, in response to determining that the channel identifier value does not match any client class identifier that is stored in association with the DHCP server logic:
- processing all request-response pairs that are stored in association with the DHCP server logic using DHCP server extension logic;
- creating, as output from the DHCP server extension logic, a plurality of definitions of zero or more channels;
- storing each of the definitions with corresponding address lease data;
- selecting a particular definition that matches the channel identifier value;
- for each network that is associated with one of the request-response pairs that is associated with the particular definition, sending, to the particular DHCP client, one or more DHCP response messages describing any changes in network address leases that the DHCP server logic performs for that network address.

15. The computer-readable storage medium of claim 10, wherein the DHCP response messages comprise IP address binding information retrieved from an IP lease status database of the DHCP server logic.

16. The computer-readable storage medium of claim 11, wherein each of the DHCP response messages is any of a DHCPLEASEACTIVE message and a DHCPLEASEUN ASSIGNED message.

17. The computer-readable storage medium of claim 11, wherein the DHCP server logic manages Internet protocol version 6 (IPv6) network addresses.

18. A computer-implemented method, comprising: a server computer initiating operation of a Dynamic Host Configuration Protocol (DHCP) server logic;
- the server logic receiving, from a particular DHCP client among a plurality of DHCP clients, an active leasequery initiation message requesting the DHCP server logic to actively send update messages about changes in network address leases that the DHCP server logic manages;
- wherein the active leasequery initiation message comprises a channel identifier value;
- wherein the channel identifier value indicates a particular class of two or more DHCP clients, of the plurality of DHCP clients, wherein the two or more DHCP clients in the particular class of DHCP clients share a same set of attributes;
- determining whether the channel identifier value matches a client class that the DHCP server logic manages;
- in response to determining that the channel identifier value does match a client class identifier that the DHCP server logic manages, sending, to the particular DHCP client, a plurality of DHCP response messages describing any changes in network address leases that the DHCP server logic performs only for the particular class of the DHCP clients that are in the matched client class;
- wherein each of the plurality of DHCP response messages is sent in response to the single active leasequery initiation message comprising the channel identifier value indicating the particular class of DHCP clients, and the single active leasequery initiation message is received by a unicast address.

19. The method of claim 18, further comprising:
- receiving data defining a plurality of request-response pairs comprising corresponding DHCP client request messages and DHCP server response messages;

in response to determining that the channel identifier value does not match any client class identifier that is stored in association with the DHCP server logic:

evaluating a stored functional expression against all of the request-response pairs;

creating, as output from the functional expression, a plurality of definitions of zero or more channels;

storing each of the definitions with corresponding address lease data;

selecting a particular definition that matches the channel identifier value;

for each network address that is associated with one of the request-response pairs that is associated with the particular definition, sending, to the particular DHCP client, one or more DHCP response messages describing any changes in network address leases that the DHCP server logic performs for that network address.

20. The method of claim 19, wherein the instructions are is further configured to cause performing, in response to determining that the channel identifier value does not match any client class identifier that is stored in association with the DHCP server logic:

processing all request-response pairs that are stored in association with the DHCP server logic using DHCP server extension logic;

creating, as output from the DHCP server extension logic, a plurality of definitions of zero or more channels;

storing each of the definitions with corresponding address lease data;

selecting a particular definition that matches the channel identifier value;

for each network address that is associated with one of the request-response pairs that is associated with the particular definition, sending, to the particular DHCP client, one or more DHCP response messages describing any changes in network address leases that the DHCP server logic performs for that network address.

\* \* \* \* \*